US009889469B2

(12) United States Patent
Gillanders et al.

(10) Patent No.: US 9,889,469 B2
(45) Date of Patent: *Feb. 13, 2018

(54) PROCESS FOR COATING THE INTERIOR SURFACES OF PIPES MADE OF NONMETAL MATERIALS

(71) Applicant: Pipe Restoration Technologies, LLC, Santa Ana, CA (US)

(72) Inventors: Larry L. Gillanders, Chilliwack (CA); Steven A. Williams, Stockton, CA (US); John Laborde, Placentia, CA (US)

(73) Assignee: Pipe Restoration Technologies, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,103

(22) Filed: May 12, 2017

(65) Prior Publication Data
US 2017/0248265 A1    Aug. 31, 2017

Related U.S. Application Data

(60) Division of application No. 15/164,268, filed on May 25, 2016, now Pat. No. 9,724,730, which is a division
(Continued)

(51) Int. Cl.
*B05D 7/22* (2006.01)
*F16L 58/18* (2006.01)
(Continued)

(52) U.S. Cl.
CPC .......... *B05D 7/222* (2013.01); *B05D 3/0406* (2013.01); *C08J 7/047* (2013.01); *C09D 163/00* (2013.01);
(Continued)

(58) Field of Classification Search
CPC .......... B05D 7/222; F16L 58/00; F16L 58/02; F16L 58/04; F16L 58/1009
(Continued)

(56) References Cited

U.S. PATENT DOCUMENTS 1,890,164 A    12/1932   Rosenberger
2,087,694 A     7/1937   Malmros
(Continued)

FOREIGN PATENT DOCUMENTS

CA    2198103    3/1996
DE    3821558    12/1989
(Continued)

OTHER PUBLICATIONS

Brady, Jr., "Control of Lead in Drinking Water," Naval Research Laboratory, Materials Research Branch, Chemistry Division, Washington, DC, Document NRL/MR/6120-97/7957, Jul. 11, 1997, 113 pages.*

(Continued)

*Primary Examiner* — William P Fletcher, III
(74) *Attorney, Agent, or Firm* — Brian S. Steinberger; Law Offices of Brian S. Steinberger, P.A.

(57) ABSTRACT

Methods and systems for cleaning, coating and sealing leaks in existing pipes made of nonmetal materials selected from a nonmetal material selected from at least one of plastics, PVC (polyvinyl chloride), composite materials, or polybutylene, in a single operation. A piping system can be cleaned in one pass by dry particulates forced and pulled by air throughout the piping system by a generator and a vacuum. Pipes with nonmetal fittings or with metal fittings or pipes with a combination of metal and nonmetal fittings can be protected from wear by water erosion and rupturing, extending the life of pipes made of nonmetal materials selected from at least one of plastics, PVC (polyvinyl chloride),
(Continued)

composite materials, or polybutylene. Coatings can be applied to pipes having diameters up to approximately 6". Leak sealants of at least approximately 4 mils thick can cover insides of pipes, and can include novel mixtures of fillers and epoxy materials, and viscosity levels. A positive pressure can be maintained within the nonmetal pipes during applications. Piping systems can be returned to service within approximately 96 hours.

16 Claims, 6 Drawing Sheets

Related U.S. Application Data of application No. 14/485,177, filed on Sep. 12, 2014, now Pat. No. 9,352,357, which is a division of application No. 13/683,332, filed on Nov. 21, 2012, now abandoned, which is a division of application No. 13/676,784, filed on Nov. 14, 2012, now Pat. No. 8,795,768, which is a division of application No. 12/813,873, filed on Jun. 11, 2010, now Pat. No. 8,343,579, which is a division of application No. 11/649,647, filed on Jan. 4, 2007, now Pat. No. 7,858,149, which is a continuation-in-part of application No. 11/246,825, filed on Oct. 7, 2005, now Pat. No. 7,517,409, which is a division of application No. 10/649,288, filed on Aug. 27, 2003, now Pat. No. 7,160,574.

(60) Provisional application No. 60/406,602, filed on Aug. 28, 2002.

(51) Int. Cl.
```
F16L 58/10      (2006.01)
B05D 3/12       (2006.01)
F16L 55/164     (2006.01)
B05D 3/04       (2006.01)
C09K 3/12       (2006.01)
C09D 163/00     (2006.01)
C08J 7/04       (2006.01)
F16L 58/02      (2006.01)
F16L 58/00      (2006.01)
F16L 58/04      (2006.01)
F16L 9/12       (2006.01)
```

(52) U.S. Cl.
CPC .............. *C09K 3/12* (2013.01); *F16L 55/164* (2013.01); *F16L 58/00* (2013.01); *F16L 58/02* (2013.01); *F16L 58/04* (2013.01); *F16L 58/1009* (2013.01); *F16L 58/18* (2013.01); *C08J 2300/00* (2013.01); *C08J 2463/00* (2013.01); *F16L 9/12* (2013.01)

(58) Field of Classification Search
USPC ............................ 427/238, 239; 138/97, 145
See application file for complete search history.

(56) References Cited

U.S. PATENT DOCUMENTS

| | | | |
|---|---|---|---|
| 2,298,775 A | 10/1942 | Raiche | |
| 2,331,824 A | 10/1943 | Buckingham | |
| 2,497,021 A | 2/1950 | Sterns | |
| 3,139,704 A | 7/1964 | McCune | |
| 3,139,711 A | 7/1964 | Soderberg, Jr. | |
| 3,151,418 A | 10/1964 | Powell et al. | |
| 3,286,406 A | 11/1966 | Ashworth | |
| 3,287,148 A | 11/1966 | Hilbush, Jr. | |
| 3,382,892 A | 5/1968 | Cerbin | |
| 3,385,587 A | 5/1968 | Smith | |
| 3,440,400 A | 4/1969 | Cotts | |
| 3,485,671 A | 12/1969 | Stephens | |
| 3,608,249 A | 9/1971 | Sullivan | |
| 3,727,412 A | 4/1973 | Marx et al. | |
| 3,835,587 A | 9/1974 | Hall, Jr. | |
| 3,925,576 A | 12/1975 | Hendrix | |
| 4,005,549 A | 2/1977 | Perry | |
| 4,117,308 A | 9/1978 | Boggs et al. | |
| 4,177,308 A | 12/1979 | Beeler | |
| 4,246,148 A | 1/1981 | Shimp et al. | |
| 4,255,468 A | 3/1981 | Olson | |
| 4,311,409 A | 1/1982 | Stang | |
| 4,314,427 A | 2/1982 | Stoltz | |
| 4,327,132 A | 4/1982 | Shinno | |
| 4,333,277 A | 6/1982 | Tasedan | |
| 4,454,173 A | 6/1984 | Koga | |
| 4,454,174 A * | 6/1984 | Koga | B05D 7/22 427/181 |
| 4,505,613 A | 3/1985 | Koga | |
| 4,576,596 A | 3/1986 | Jackson et al. | |
| 4,579,596 A | 4/1986 | Murzyn | |
| 5,007,461 A | 4/1991 | Naf | |
| 5,017,258 A | 5/1991 | Brown et al. | |
| 5,045,352 A | 9/1991 | Mueller | |
| 5,046,289 A | 9/1991 | Bengel et al. | |
| 5,085,016 A | 2/1992 | Rose | |
| 5,192,816 A | 3/1993 | Iizuka | |
| 5,231,804 A | 8/1993 | Abbott | |
| 5,460,563 A | 10/1995 | McQueen, Jr. | |
| 5,499,659 A | 3/1996 | Naf | |
| 5,544,859 A | 8/1996 | Coltrinari et al. | |
| 5,622,209 A * | 4/1997 | Naf | B05D 7/22 138/97 |
| 5,643,057 A | 7/1997 | Isaacson | |
| 5,707,702 A | 1/1998 | Brady, Jr. et al. | |
| 5,800,629 A | 9/1998 | Ludwig et al. | |
| 5,915,395 A | 6/1999 | Smith | |
| 5,924,913 A * | 7/1999 | Reimelt | F16L 55/164 29/402.18 |
| 5,936,022 A | 8/1999 | Freeman | |
| 5,950,681 A | 9/1999 | Reimelt | |
| 6,316,016 B1 | 11/2001 | Iwakawa | |
| 6,345,632 B1 | 2/2002 | Ludwig et al. | |
| 6,397,895 B1 | 6/2002 | Lively | |
| 6,423,152 B1 | 7/2002 | Landaas | |
| 6,739,950 B1* | 5/2004 | Kruse | B05D 7/222 451/28 |
| 7,041,176 B2 | 5/2006 | Kruse | |
| 7,066,730 B2 | 6/2006 | MacAluso | |
| 7,160,574 B1 | 1/2007 | Gillanders et al. | |
| 7,270,847 B2 | 9/2007 | Horn | |
| 7,517,409 B1 | 4/2009 | Gillanders et al. | |
| 7,605,195 B1 | 10/2009 | Ward et al. | |
| 7,771,542 B1 | 8/2010 | Hunt et al. | |
| 7,858,149 B2 | 12/2010 | Gillanders et al. | |
| 8,343,579 B2* | 1/2013 | Gillanders | 427/238 |
| 8,486,314 B1* | 7/2013 | Terry | B05C 7/04 264/36.1 |
| 8,524,320 B1 | 9/2013 | Gillanders | |
| 8,696,823 B1 | 4/2014 | Gillanders | |
| 8,795,768 B2* | 8/2014 | Gillanders | B05D 3/12 427/230 |
| 9,273,815 B2 | 3/2016 | Gillanders | |
| 9,352,357 B2* | 5/2016 | Gillanders | B05D 3/12 |
| 9,724,730 B2 | 8/2017 | Gillanders | |
| 2004/0132387 A1 | 7/2004 | Kruse | |
| 2004/0163684 A1 | 8/2004 | Hapke | |
| 2007/0128353 A1 | 6/2007 | Gillanders et al. | |
| 2010/0047439 A1 | 2/2010 | Gillanders et al. | |
| 2012/0273078 A1* | 11/2012 | Hawwa | F16L 55/163 138/98 |
| 2016/0296972 A1* | 10/2016 | Gillanders | B05D 3/12 |

FOREIGN PATENT DOCUMENTS

| | | |
|---|---|---|
| DE | 4404473 | 9/1995 |
| EP | 0299134 | 2/1988 |
| EP | 0393433 | 4/1990 |
| EP | 0551790 | 7/1993 |

(56) References Cited

FOREIGN PATENT DOCUMENTS

| | | |
|---|---|---|
| EP | 0634229 | 7/1994 |
| EP | 0637737 | 7/1994 |
| EP | 0634229 A1 * | 1/1995 |
| EP | 1674495 | 6/2006 |
| EP | 07716240.2 | 7/2009 |
| EP | 07716240 | 6/2011 |
| GB | 2140377 | 11/1984 |
| JP | 5822662 | 2/1983 |
| JP | 06126245 | 5/1994 |
| JP | 3737569 | 2/1998 |
| RU | 116040 | 2/1959 |
| WO | WO 1996/031298 A1 * | 10/1996 |
| WO | 2008088317 | 7/2008 |
| WO | PCT/US07/000072 | 8/2008 |
| WO | 2009014760 | 1/2009 |
| WO | 2011040899 | 4/2011 |

OTHER PUBLICATIONS

"In-situ Epoxy Coating for Metallic Pipe," Public Works Technical Bulletin 420-49-35, US Army Corps of Engineers, Jun. 15, 2001, 32 pages.*
Gillanders, U.S. Appl. No. 90/013,528, filed Jul. 6, 2015 for Reexamination of U.S. Pat. No. 7,160,574 Patent Owner's Response to PTO Office Action; dated Feb. 9, 2016, 35 pages.
Gillanders, U.S. Appl. No. 90/013,528, filed Jul. 6, 2015 for Reexamination U.S. Pat. No. 7,160,574, Official Action from PTO dated Apr. 1, 2016, 53 pages.
SSPC—The Society for Protective Coatings and NACE International Standard, Joint Surface Preparation Standard, SSPC-SP 5/NACE No. 1 White Metal Blast Cleaning, copyrighted SSPC: The Society for Protective Coatings, Pittsburg, PA. Sep. 1, 2000, pp. 55-59, 5 pages.
Gillanders, L., U.S. Appl. No. 13/676,784, filed Nov. 14, 2012, Response filed to U.S. Patent Office on Mar. 7, 2014, 41 pages.
Gillanders, L., U.S. Appl. No. 13/676,784, filed Nov. 14, 2012, Notice of Allowance received from the U.S. Patent Office dated Mar. 27, 2014, 13 pages.
Gillanders, L., U.S. Appl. No. 13/676,784, filed Nov. 14, 2012. Response filed to U.S. Patent Office on Apr. 1, 2014, 80 pages.
Gillanders, L., U.S. Appl. No. 13/676,784, filed Nov. 14, 2012, Office Action Summary received from the U.S. Patent Office dated Apr. 9, 2014, 11 pages.
ACE DuraFlo—The Modern Pipe Renovation System, 2001, online, retrieved on Oct. 20, 2005, retrieved from http://web.archive,org/web/2011021003415/http://aceduraflo.com/index.html, 13 pages.
ACE Duraflo—The Modern Pipe Renovation System, 2001, online, retrieved on Oct. 20, 2005, retrieved from http://web.archive.org/web/2011129000953/http://aceduraflo.com/index.html, 11 pages.
ACE Duraflo—The Modern Pipe Renovation System, 2001, online, retrieved on Oct. 20, 2005, retrieved from http://web.archive.org/web/20011210171031/http://aceduraflo.com./index.html, 13 pages.
ACE Duraflo—The Modern Pipe Renovation System, 2001, 11 pgs., online, retrieved on Oct. 20, 2005, retrieved from http://www.aceduraflo.com/index.html.
American Pipe Lining, Inc., In-Place Pipe Restoration, date unknown, brochure, 9 pages.
NICITCP Session I Student Handbook, Abrasive Blast Cleaning, Mar. 1992, 6 pages.
Guan, S., PhD and Kennedy H, B. Sc., MBA. A Performance Evaluation of Internal Linings of Municipal Pipe, 1996 North American Corrosion Engineers, Denver, Colorado, 14 pages.
McGovern, M., Can Coatings Protect Wastewaster Treatment Systems? County Sanitation Districts of Los Angeles County tests the sulfuric-acid resistance of 78 products, The Aberdeen Group, 1999, 3 pages.
Warren IC. In Situ Epoxy Resin Lining—Operational Guidelines and Code of Practice. Water Research Centre (WRc), Swindon, UK 1989, 5 pages.

Deb, et al. Service Life Analysis of Water Main Epoxy Lining, AwwaRF, USA, 2006, 18 pages.
Redner, et al., Evaluation of Protective Coatings for Concrete. County Sanitation Districts of Los Angeles, Whittier California, Aug. 1998, 36 pages.
AWWA, American Water Works Assocation. C210-03 Liquid Epoxy Coating Systems for the Interior and Exterior of Steel Water Pipelines, Jun. 1, 2004, Denver, Colorado, 28 pages.
U.S. Army Corps of Engineers, in Situ Epoxy Coating for Metallic Pipe Guidance, Public Works Technical Bulletin 420-49-35, 2001, U.S. Army Corps of Engineers, Washington, D.C., 32 pages.
Boyd et. al., Lead Pipe Rehabilitation and Replacement Techniques for Drinking Water Service: Review of Available and Emerging Technologies, Trenchless Tech, 2001, pp. 13-24, vol. 15, No. 1, 12 pages.
Brady, Licensing Agreement between American Pipe Lining, Inc. and U.S. Navy, Aug. 1996, 19 pages.
ABSS Visual Comparator Guide Degrees of Cleanliness, Sep. 9, 2013, 1 page.
Patentees response to Reexam U.S. Appl. No. 95/001,717, filed Feb. 2, 2012, 79 pages.
3rd party requesters response to Reexam U.S. Appl. No. 95/001,717, filed Sep. 13, 2011, 56 pages.
Interparty Reexam, U.S. Appl. No. 95/001,717, filed Aug. 17, 2011, 137 pages.
American Pipe Lining, Inc., In-Place Pipe Restoration, 2001, 11 pgs, online, retrieved on Oct. 25, 2005, retrieved from http://web.archive.org/web20010801213356/www.ampipelining.com/index.html, 12 pages.
ACE DuraFlo—The Modern Pipe Renovation System, 2001, online, retrieved on Oct. 20, 2005, retrieved from http://web.archive.org/web/2011021003415/http://aceduraflo.com/index.html, 13 pages.
ACE DuraFlo Dust Collector Service Manual, ACE DuraFlo Systems, LLC, 2001, Manual, 6 pages.
Brady, Fact Sheet from the Navy Pollution Prevention Conference on the Restoration of Drinking Water Piping with Nontoxic Epoxy Linings, 1995, Navy Pollution Prevention Conference, Arlington, VA, EnviroSense, 4 pages.
Brady, et. al., Epoxy Lining for Shipboard Piping Systems, Materials Chemistry Branch, Chemistry Division, NRL/MR/6120-94-7629, 1994, 29 pages.
Demboski, et. al., Evolutions in U.S. Navy Shipboard Sewage and Graywater Programs, retrieved on Sep. 3, 2014, 16 pages.
Gillanders, U.S. PCT Patent Application No. PCT/US09/05514 filed Oct. 7, 2009, International Search Report dated Apr. 13, 2010, 4 pages.
Reexamination Request for U.S. Pat. No. 7,160,574 filed Jun. 14, 2015, 11 pages.
Reexamination Request for U.S. Pat. No. 7,160,574 filed Jul. 6, 2015, 90 pages.
Hei, Asaki, Toyo Lining Report Technical Evaluations, Jul. 16, 1981, 57 pages.
Brady, Robert F., Jr., Restoration of Drinking Water Piping With Nontoxic Epoxy Linings, published on Proceedings of the Tree-Service Environment Technology Workshop, "Enhancing Readiness Through Environmental Quality Technology" held in Hershey, PA on the May 20-22, 1996, 6 pages.
Brady, Robert F., Jr., Control of Lead in Drinking Water, Jul. 11, 1997, Naval Research Laboratory, 113 pages.
Information Disclosure Statement (IDS) for Reexamination Request for U.S. Pat. No. 7,160,574 filed Jul. 6, 2015, 2 pages.
Second Reexamination Request for U.S. Pat. No. 8,344,579 filed Jul. 10, 2015, 384 pages.
Gillanders, Appeal No. 2014-001128, Re-Exam U.S. Appl. No. 95/001,717, Re-Exam Filing Date Sep. 13, 2011, U.S. Pat. No. 7,858,149, Patent Owner's Request to Reopen Prosecution Pursuant to 37 C.F.R. 41 77 (b) (1) Filed Feb. 17, 2015, 49 pages.
Gillanders, Re-Exam U.S. Appl. No. 95/001,717, Re-Exam filing date Sep. 13, 2011, U.S. Pat. No. 7,858,149, Information Disclosure Statement by Applicant (Not for Submission under 37 CFR 1.99) filed Feb. 17, 2015, 4 pages.

(56) References Cited

OTHER PUBLICATIONS

Gillanders, U.S. Appl. No. 60/406,602, filed Aug. 28, 2002, 40 pages.
Gillanders, U.S. Appl. No. 13/676,784, filed Nov. 14, 2012, Amendment Response filed with PTO on Apr. 25, 2014, 13 pages.
ASTM International, Designation: D4541-02, Standard Test Method for Pull-Off Strength of Coatings Using Portable Adhesion Testers, 2014, 13 pages.
Gillanders, Re-Exam U.S. Appl. No. 95/001,717, Re-Exam Filing Date Sep. 13, 2011, U.S. Pat. No. 7,858,149, Electronic Acknowledgment Receipt, dated Feb. 17, 2015, 2 pages.
Gillanders, Re-Exam U.S. Appl. No. 95/001,717, Re-Exam Filing Date Sep. 13, 2011, U.S. Pat. No. 7,858,149, Decision on Request for Hearing dated Jan. 16, 2015, 9 pages.
Gillanders, Re-Exam U.S. Appl. No. 90/013,429, Re-Exam Filing Date Jan. 19, 2015, U.S. Pat. No. 8,343,579, Request for Ex Parte Reexamination dated Feb. 27, 2015, 15 pages.
Gillanders, Re-Exam U.S. Appl. No. 90/013,42, Re-Exam Filing Date Jan. 19, 2015, U.S. Pat. No. 8,343,579, 37 CFD 1.501 Information Disclosure Citation in a Patent, mailed Feb. 25, 2015, 2 pages.
Scotchkote 134 Fusion Bonded Epoxy Coating, Information, Properties and Test Results, 3M Corrosion Protection Products, 2000, 14 pages.
Vista Irrigation District Standard Specifications, Section 04100—Fusion-Bonded Epoxy Linings and Coatings, Vista Irrigation District (Rev. Mar. 1999), 7 pages.
Mark Schilling, Coating Adhesion Testing in Accordance with ASTM D4541—Sticky Business, Apr. 2004, 2 pages.
Gillanders, et al., Methods and Systems for Coating and Sealing Inside Piping Systems, U.S. Appl. No. 14/485,177, filed Sep. 12, 2014 (Divisional of '579 Patent in Reexam), Information Disclosure Statement (IDS) filed with PTO on May 20, 2015, "All References Considered Expect Where Lined Through", 4 pages.
Order Denying Defendants' Motion for Partial Summary Judgment of Invalidity and Granting in Part Plaintiff's Motion for Summary Judgment of Validity, United States District Court Central District of California Southern Division, *Pipe Restoration Technologies, LLC, et al.* v. *Pipeline Restoration Plumbing, Inc. et al.*, Case No. SACV 1300499-CJC (RNBx), Jul. 8, 2014, 10 pages.
"Your Home's Plumbing System", by Tim Oglesby (Home Check America). This document is accessible at web.archive.org website at (version of Dec. 22, 2005): http://web.archive.Org/web/20051222132445/http://media.reliancenetwork.com/media/downloads/RemaxIL/200565101848.pdf. 8 pages.
"Water Pipeline Design Guidelines", published by Saskatchewan Environment (dated Apr. 2004). This document is accessible at web.archive.org website at (version of Mar. 11, 2012): https://web.archive.Org/web/20120311170322/http://www.saskh2o.ca/DWBinder/EPB276WaterPipelineDesignGuidelines.pdf. 13 pages.
"High water pressure fact sheet", published by City of Olympia (Capital of Washington State). This document is accessible at web.archive.org website at (version of Nov. 12, 2012): https://web.archive.Org/web/20121102104045/http://olympiawa.gov/cityutilities/drinking-water/conservation/~/media/Files/PublicWorks/WaterResources/PRV%20Flyer__2012.pdf. 2 pages.
"Water Pressure: What Causes It?", published by Columbus Water Works. This document is accessible at web. archive.org website at (version of Mar. 28, 2014): https://web.archive.Org/web/20140328093048/https://www.cwwga.org/documentlibrary/180_billstuffer%20-%20april%202011%20-%20water%20pressure.pdf. 2 pages.
"Codigo Tecnico de la Edification: Salubridad", published by the Spanish Ministry of Public Works and Transportation (document in Spanish). The norms included in this document are of general application in Spain. This document is accessible at web.archive.org website at (version of Apr. 9, 2011): https://web.archive.Org/web/20110409122148/http://www.codigotecnico.org/cte/export/sites/default/web/galerias/archivos/DB_HS_2009.pdf. 135 pages.
"Pressure Pipe System Ratings", published by Polypipe. This document is accessible at web.archive.org website at (version of Mar. 28, 2014): https://web.archive.Org/web/20140328093900/http://www.polypipe.com/cms/toolbox/Terrain_Pressure_HPPE_Pipe_System_Ratings.pdf. 5 pages.
"Ezeeflow Technical Manual", published by Ezeeflow. This document is accessible at web.archive.org website at (version of Sep. 7, 2012): https://web.archive.Org/web/20120907105306/http://www.globalhardwaregy.com/wp-upload/2011/06/Ezeeflow_Catalog_.pdf. 25 pages.
Gillanders, U.S. Appl. No. 12/881,328, filed Sep. 14, 2010. Office Action Summary received from the U.S. Patent Office, dated Nov. 19, 2013, 10 pages.
Gillanders, U.S. Appl. No. 11/946,107, filed Nov. 28, 2007, Notice of Allowance received from the U.S. Patent Office, dated Feb. 27, 2014, 9 pages.
A-S Method, We are a person you are looking for A-S Method Pipe Rehabilitation System, Toyo Lining CO., Ltd., 1981, pp. 00789-00807, 19 pages.
Gillanders, European Patent Application 15178498.0-1754 filed Jul. 27, 2015, Extended European Search Report dated Nov. 27, 2015, 11 pages.
Gillanders, European Patent Application 12747878.2-1301 filed Aug. 10, 2012, Extended Supplementary European Search Report dated Dec. 23, 2015, 14 pages.
NSF/ANSI 61-2002e, Section 5. Barrier Materials, 2002, 8 pages.
ANSI/AWWA C210-97, AWWA Standard for Liquid-Epoxy Coating Systems for the Interior and Exterior of Steel Water Pipelines, 1997, 24 pages.
Gillanders, U.S. Appl. No. 90/013,429, filed Jul. 23, 2015 for Reexamination of U.S. Pat. No. 8,343,579 merged with Gillanders, U.S. Appl. No. 90/013,548, filed Jul. 23, 2015 for Reexamination of U.S. Pat. No. 8,343,579 Official Action from PTO dated Nov. 23, 2015, 6 pages.

\* cited by examiner

PROCESS FOR COATING THE INTERIOR SURFACES OF PIPES MADE OF NONMETAL MATERIALS

This is a Divisional of U.S. patent application Ser. No. 15/164,268 filed May 25, 2016, now U.S. Pat. No. 9,724,730, which is a Divisional of U.S. patent application Ser. No. 14/485,177 filed Sep. 12, 2014, now issued as U.S. Pat. No. 9,352,357, which is a Divisional of U.S. patent application Ser. No. 13/683,332 filed Nov. 21, 2012, now abandoned, which is a Divisional of U.S. patent application Ser. No. 13/676,784 filed Nov. 14, 2012, now U.S. Pat. No. 8,795,768, which is a Divisional of U.S. patent application Ser. No. 12/813,873 filed Jun. 11, 2010, now U.S. Pat. No. 8,343,579, which is a Divisional of U.S. patent application Ser. No. 11/649,647 filed Jan. 4, 2007, now issued as U.S. Pat. No. 7,858,149, which is a Continuation-In-Part of U.S. patent application Ser. No. 11/246,825 filed Oct. 7, 2005, now issued as U.S. Pat. No. 7,517,409, which is a Divisional of U.S. patent application Ser. No. 10/649,288 filed Aug. 27, 2003, now issued as U.S. Pat. No. 7,160,574 on Jan. 9, 2007, which claims the benefit of priority to U.S. Provisional Patent Application 60/406,602 filed Aug. 28, 2002, all of which are incorporated by reference.

FIELD OF INVENTION

This invention relates to repairing leaks in pipes, and in particular to methods, systems and apparatus for repairing leaks and providing barrier protective coatings in a single operation to the interior walls of small diameter metal and plastic pressurized pipes such as pressurized drain lines, hot water lines, cold water lines, potable water lines, natural gas lines, HVAC piping systems, and fire sprinkler system lines, and the like, that are used in multi-unit residential buildings, office buildings, commercial buildings, and single family homes, and the like.

BACKGROUND AND PRIOR ART

Large piping systems such as those used in commercial buildings, apartment buildings, condominiums, as well as homes and the like that have a broad base of users commonly develop problems with their pipes such as their water and plumbing pipes, and the like. Presently when a failure in a piping system occurs the repair method may involve a number of separate applications. Those repair applications may involve a specific repair to the area of failure such as replacing that section of pipe or the use of a clamping devise and a gasket.

Traditional techniques to correct for the leak have included replacing some or all of a building's pipes. In addition to the large expense for the cost of the new pipes, additional problems with replacing the pipes include the immense labor and construction costs that must be incurred for these projects.

Most piping systems are located behind finished walls or ceilings, under floors, in concrete or underground. From a practical viewpoint simply getting to the problem area of the pipe to make the repair can create the largest problem. Getting to the pipe for making repairs can require tearing up the building, cutting concrete and/or having to dig holes through floors, the foundation or the ground. These labor intensive repair projects can include substantial demolition of a buildings walls and floors to access the existing piping systems. For example, tearing out of the interior walls to access the pipes is an expected result of the demolition necessary to fix existing pipes.

There is usually substantial time-consuming costs for removing the debris and old pipes from the worksite. With these projects both the cost of new pipes and the additional labor to install these pipes are required expenditures. Further, there are additional added costs for the materials and labor to replumb these new pipes along with the necessary wall and floor repairs that must be made to clean up for the demolition effects. For example, getting at and fixing a pipe behind drywall is not completing the repair project. The drywall must also be repaired, and just the drywall type repairs can be extremely costly. Additional expenses related to the repair or replacement of an existing piping system will vary depending primarily on the location of the pipe, the building finishes surrounding the pipe and the presence of hazardous materials such as asbestos encapsulating the pipe. Furthermore, these prior known techniques for making piping repair take considerable amounts of time which results in lost revenue from tenants and occupants of commercial type buildings since tenants cannot use the buildings until these projects are completed.

Finally, the current pipe repair techniques are usually only temporary. Even after encountering the cost to repair the pipe, the cost and inconvenience of tearing up walls or grounds and if a revenue property the lost revenue associated with the repair or replacement, the new pipe will still be subject to the corrosive effects of fluids such as water that passes through the pipes.

Over the years many different attempts and techniques have been proposed for cleaning water type pipes with chemical cleaning solutions. See for example, U.S. Pat. No. 5,045,352 to Mueller; U.S. Pat. No. 5,800,629 to Ludwig et al.; U.S. Pat. No. 5,915,395 to Smith; and U.S. Pat. No. 6,345,632 to Ludwig et al. However, these systems generally require the use of chemical solutions such as liquid acids, chlorine, and the like, that must be run through the pipes as a prerequisite prior to any coating of the pipes.

Other systems have been proposed that use dry particulate materials as a cleaning agent that is sprayed from mobile devices that travel through or around the pipes. See for example, U.S. Pat. No. 4,314,427 to Stolz; and U.S. Pat. No. 5,085,016 to Rose. However, these traveling devices generally require large diameter pipes to be operational and cannot be used inside of pipes that are less than approximately 6 inches in diameter, and would not be able to travel around narrow bends. Thus, these devices cannot be used in small diameter pipes found in potable water piping systems that also have sharp and narrow bends.

Other repair type techniques for sealing and repairing pipes have included, for example, U.S. Pat. No. 5,622,209 to Naf; U.S. Pat. No. 4,505,613 to Koga; U.S. Pat. No. 4,311,409 to Stang; U.S. Pat. No. 3,727,412 to Marx et al.; and U.S. Pat. No. 3,287,148 to Hilbush.

Hilbush '148 describes a process for sealing laid gas pipes by blowing in a foamed sealing emulsion. The foam settles on the internal wall and condenses there. In the case of leaks, it tends to settle in larger quantities which make this technique unsuitable for many applications. This method is expressly suited only to gas pipes; solid additions to the sealing emulsion are neither taught nor made obvious.

Marx, '412 describes a repair process in which the portion of the pipe with the leak is sealed at the front and rear ends. A specially stabilized emulsion is then pressed in which issues at the leak, is destabilized there and coagulates so that the leak is sealed. Actual solid sealing materials are not therefore pressed into the pipes and the vehicle is water, not gas.

Stang '409 describes the sealing of leaks in laid pipes by very fine substances having a high capillary action. The very fine and difficult to use substance is arranged externally at the leak and is watered there. The capillary pressure thus obtained counteracts the delivery pressure of the medium flowing in the pipe. The very fine insulating material must be laid onto the conduit from the exterior, after excavation of the leak.

Koga '613 describes a process and an apparatus for the internal repair of laid pipes by means of "plastic mist" conveyed in a gas stream. It is unclear whether actual leaks are also sealed with it. More importantly, this process does not appear to be able to immediately produce the plastic mist necessary to work.

Naf '209 describes s process where a sealant is introduced with water and is part of a water sealant mixture. The water sealant mixture fills a pipe resulting in adding multiple steps to the process of filling, setting up a hydraulic recirculating system, draining and drying the piping system. The water/sealant mixture may also flow from the leaking section creating water damage to the immediate area.

None of the prior art techniques describe a process where a barrier coating and leaks are sealed with a barrier coating application combined with a leak sealing operation.

Thus, the need exists for solutions to the above problems where providing a barrier coating and sealing leaks is accomplished in piping systems in a single operation.

SUMMARY OF THE INVENTION

A primary objective of the invention is to provide methods, systems and devices for repairing interior walls and sealing leaks of pressurized pipes in buildings without having to physically remove and replace the pipes, where the leaks are sealed and the barrier coating is applied in a single operation.

A secondary objective of the invention is to provide methods, systems and devices for repairing interior walls and sealing leaks, in a single operation in pipes by initially cleaning the interior walls of the pipes.

A third objective of the invention is to provide methods, systems and devices for repairing interior walls and sealing leaks, in a single operation in pipes by applying a corrosion protection barrier coating to the interior walls of the pipes that provides a barrier coating and seals leaks in one operation.

A fourth objective of the invention is to provide methods, systems and devices for repairing interior walls and sealing leaks, in a single operation, in pipes in buildings in a cost effective and efficient manner.

A fifth objective of the invention is to provide methods, systems and devices for repairing interior walls and sealing leaks, in a single operation, in pipes which is applicable to small diameter piping systems from approximately ⅜" to approximately 6" in diameter in piping systems made of various materials such as galvanized steel, black steel, lead, brass, copper or other materials such as PVC, and composites including plastics, as an alternative to pipe replacement or repair.

A sixth objective of the invention is to provide methods, systems and devices for repairing interior walls and sealing leaks in pipes, in a single operation which is applied to pipes, "in place" or insitu minimizing the need for opening up walls, floors ceilings, or grounds.

A seventh objective of the invention is to provide methods, systems and devices for repairing interior walls and sealing leaks in pipes, in a single operation, which minimizes the disturbance of asbestos lined piping or walls/ceilings that can also contain lead based paint or other harmful materials.

An eighth objective of the invention is to provide methods, systems and devices for repairing interior walls and sealing leaks in pipes, in a single operation, where once the existing piping system is restored with a durable epoxy barrier coating the common effects of corrosion from water passing through the pipes will be delayed if not stopped entirely.

A ninth objective of the invention is to provide methods, systems and devices for repairing interior walls and sealing leaks in pipes, in a single operation, to clean out blockage where once the existing piping system is restored, users will experience an increase in the flow of water, which reduces the energy cost to transport the water. Additionally, the barrier epoxy coating leak sealant being applied to the interior walls of the pipes can create enhanced hydraulic capabilities again giving greater flow with reduced energy costs.

A tenth objective of the invention is to provide methods, systems and devices for repairing interior walls and sealing leaks in pipes, in a single operation, where customers benefit from the savings in time associated with the restoration of an existing piping system.

An eleventh objective of the invention is to provide methods, systems and devices for repairing interior walls and sealing leaks in pipes, in a single operation, where customers benefit from the economical savings associated with the restoration and in-place leak repair of an existing piping system, since walls, ceilings, floors, and/or grounds do not always need to be broken and/or cut through.

A twelfth objective of the invention is to provide methods, systems and devices for repairing interior walls and sealing leaks in pipes, in a single operation, where income producing properties experience savings by remaining commercially usable, and any operational interference and interruption of income-producing activities is minimized.

A thirteenth objective of the invention is to provide methods, systems and devices for repairing interior walls and sealing leaks in pipes, in a single operation, where health benefits had previously accrued, as the water to metal contact will be stopped by a barrier coating thereby preventing the leaching of metallic and potentially other harmful products from the pipe into the water supply such as but not limited to lead from solder joints and from lead pipes, and any excess leaching of copper, iron and lead.

A fourteenth objective of the invention is to provide methods, systems and devices for repairing interior walls and sealing leaks in pipes, in a single operation where the pipes are being restored and repaired, in-place, thus causing less demand for new metallic pipes, which is a non-renewable resource.

A fifteenth objective of the invention is to provide methods, systems and devices for repairing interior walls and sealing leaks in pipes, in a single operation, using a less intrusive method of repair where there is less building waste and a reduced demand on expensive landfills.

A sixteenth objective of the invention is to provide methods, systems and devices for repairing interior walls and sealing leaks in pipes, in a single operation, where the process uses specially filtered air that reduces possible impurities from entering the piping system during the process.

A seventeenth objective of the invention is to provide methods, systems and devices for repairing interior walls and sealing leaks in pipes, in a single operation, where the equipment package is able to function safely, cleanly, and efficiently in high customer traffic areas.

An eighteenth objective of the invention is to provide methods, systems and devices for repairing interior walls and sealing leaks in pipes, in a single operation where the equipment components are mobile and maneuverable inside buildings and within the parameters typically found in single-family homes, multi unit residential buildings and various commercial buildings.

A nineteenth objective of the invention is to provide methods, systems and devices for repairing interior walls and sealing leaks in pipes, in a single operation, where the equipment components can operate quietly, within the strictest of noise requirements such as approximately seventy four decibels and below when measured at a distance of approximately several feet away.

A twentieth objective of the invention is to provide methods, systems and devices for repairing interior walls and sealing leaks in pipes, in a single operation where the barrier coating leak sealant material for application in a variety of piping environments, and operating parameters such as but not limited to a wide temperature range, at a wide variety of airflows and air pressures, and the like.

A twenty first objective of the invention is to provide methods, systems and devices for repairing interior walls and sealing leaks in pipes, in a single operation where the barrier coating leak sealant material and the process is functionally able to deliver turnaround of restored piping systems to service within approximately twenty four hours or less.

A twenty second objective of the invention is to provide methods, systems and devices for repairing interior walls and sealing leaks in pipes, in a single operation, where the barrier coating material is designed to operate safely under NSF (National Sanitation Foundation) Standard 61 criteria in domestic water systems, with adhesion characteristics within piping systems in excess of approximately 400 PSI.

A twenty third objective of the invention is to provide methods, systems and devices for repairing interior walls and sealing leaks in pipes, in a single operation where the barrier coating material is designed as a long-term, long-lasting, durable solution to pipe corrosion, pipe erosion, pinhole leak repair and related water damage to piping systems where the barrier coating extends the life of the existing piping system.

A twenty fourth objective of the invention is to provide methods, systems and devices for both cleaning and coating interiors and leak sealing, the interior of pipes having diameters of up to approximately 6 inches using dry particulates, such as sand and grit, prior to coating the interior pipe walls.

A twenty fifth objective of the invention is to provide methods, systems and devices for cleaning coating interiors and sealing leaks of pipes having diameters of up to approximately 6 inches in buildings, without having to section off small sections of piping for cleaning coating and leak sealing applications.

A twenty sixth objective of the invention is to provide methods, systems and devices for cleaning the interiors of an entire isolated piping system in a building in a single pass run operation.

A twenty seventh objective of the invention is to provide methods, systems and devices for barrier coating and leak sealing the interiors of an entire isolated piping system in a building in a single pass run operation.

The novel method and system of pipe restoration prepares and protects small diameter piping systems such as those within the diameter range of approximately ⅜ of an inch to approximately six inches and can include straight and bent sections of piping from the effects of water corrosion, erosion and electrolysis and sealing leaks in-place, thus extending the life of small diameter piping systems. The barrier coating used as part of the novel process method and system, can be used in pipes servicing potable water systems, meets the criteria established by the National Sanitation Foundation (NSF) for products that come into contact with potable water. The epoxy material also meets the applicable physical criteria established by the American Water Works Association as a barrier coating. Application within buildings ranges from single-family homes to smaller walk-up style apartments to multi-floor concrete high-rise hotel/resort facilities and office towers, as well as high-rise apartment and condominium buildings and schools. The novel method process and system allows for barrier coating and leak repair, in a single operation to potable water lines, natural gas lines, HVAC piping systems, hot water lines, cold water lines, pressurized drain lines, and fire sprinkler systems.

The novel method of application of an epoxy barrier coating leak sealant is applied to pipes right within the walls eliminating the traditional destructive nature associated with a re-piping job. Typically 1 system or section of pipe can be isolated at a time and the restoration of the system or section of pipe can be completed in less than one to four days (depending upon the building size and type of application) with water restored within approximately less than approximately 24 to approximately 96 hours. For hotel and motel operators that means not having to take rooms off line for extended periods of time. Too, for most applications, there are no walls to cut, no large piles of waste, no dust and virtually no lost room revenue. Entire building piping systems can be cleaned within one run through pass of using the invention. Likewise, an entire building piping system can be coated and leaks sealed within one single pass operation as well.

Once applied, the epoxy coating not only seals the leak but creates a barrier coating on the interior of the pipe in the same operation. The application process and the properties of the epoxy coating ensure the interior of the piping system is fully coated and leaks repaired. Epoxy coatings are characterized by their durability, strength, adhesion and chemical resistance, making them an ideal product for their application as a barrier coating and leak sealant on the inside of small diameter piping systems.

The novel barrier coating provides protection and extended life to an existing piping system that has been affected by erosion corrosion caused from internal burrs, improper soldering, excessive turns, and excessive water velocity in the piping system, electrolysis and "wear" on the pipe walls created by suspended solids. The epoxy barrier coating will create at least an approximately 4 mil covering to the inside of the piping system and will seal leaks spanning up to approximately 125 mils.

There are primarily 3 types of metallic piping systems that are commonly used in the plumbing industry—copper, steel and cast iron. New steel pipes are treated with various forms of barrier coatings to prevent or slow the effects of corrosion. The most common barrier coating used on steel pipe is the application of a zinc based barrier coat commonly called galvanizing. New copper pipe has no barrier coating protection and for years was thought to be corrosion resistant offering a lifetime trouble free use as a piping system.

Under certain circumstances that involved a combination of factors of which the chemistry of water and installation practices a natural occurring barrier coating would form on the inside of copper pipes which would act as a barrier coating, protecting the copper piping system against the effects of corrosion from the water.

In recent history, due to changes in the way drinking water is being treated and changes in installation practices, the natural occurring barrier coating on the inside of copper pipe is not being formed or if it was formed is now being washed away. In either case without an adequate natural occurring barrier coating, the copper pipe is exposed to the effects of corrosion/erosion, which can result in premature aging and failure of the piping system, most commonly referred to as a pinhole leak.

With galvanized pipe the zinc coating wears away leaving the pipe exposed to the effects of the corrosive activity of the water. This results in the pipe rusting and eventually failing.

The invention can also be used with piping systems having plastic pipes, PVC pipes, composite material, and the like.

The novel method and system of corrosion control by the application of an epoxy barrier coating and sealant can be applied to existing piping systems in-place, in the same operation.

The invention includes novel methods and equipment for providing barrier coating corrosion and a repair method for sealing leaks for the interior walls of small diameter piping systems in the same operation. The novel process method and system of internal leak repair and corrosion control includes at least three basic steps: Air Drying a piping system to be serviced; profiling the piping system using an abrasive cleaning agent; and applying the barrier coating leak sealant to selected coating thickness layers inside the pipes. The novel invention can also include two additional preliminary steps of: diagnosing problems with the piping system to be serviced, and planning and setting up the barrier coating leak repair project onsite. Finally, the novel invention can include a final end step of evaluating the system after applying the barrier coating leak repair and re-assembling the piping system.

A novel method and process of applying a barrier coating leak sealant to pipes to fix openings and cracks in the pipes, can include the steps of mixing an epoxy material to form a barrier coating leak sealant having a viscosity range of approximately 1,200 cps to approximately 60,000 cps at room temperature, applying the barrier coating leak sealant to interior walls of the pipes without dismantling all of the piping system, wherein the barrier coating leak sealant provides an interior barrier for protecting the interior walls of the pipes and sealing leak openings up to approximately 125 mils in diameter, and restoring the pipes of the existing piping system to service is less than approximately ninety six hours. A more preferable viscosity range is between approximately 10,000 cps to approximately 60,000 cps.

The method and process can further include the step of mixing an additional filler material with the barrier coating to further fill in the leak openings. The filler can be additional epoxy material. The additional filler material can be selected from the group consisting of: glass flakes, glass fibers, epoxy fibers, mica, clay, silica, cork, and plastics.

Approximately 100 to approximately 200 milliliters of unfilled epoxy can be used for pipes having a length of approximately 5 feet to approximately 30 feet, where the pipes are approximately ½ inch in diameter.

Approximately 100 to approximately 300 milliliters of unfilled epoxy can be used for pipes having a length of approximately 5 feet to approximately 30 feet, where the pipes are approximately ¾ inch in diameter.

Approximately 100 to approximately 400 milliliters of unfilled epoxy can be used for pipes having a length of approximately 5 feet to approximately 30 feet, where the pipes are approximately 1 inch in diameter.

Approximately 100 to approximately 500 milliliters of unfilled epoxy can be used for the pipes having a length of approximately 5 feet to approximately 30 feet, where the pipes are approximately 1¼ inch in diameter.

Approximately 100 to approximately 600 milliliters of unfilled epoxy can be used for pipes having a length of approximately 5 feet to approximately 30 feet, where the pipes are approximately 1½ inch in diameter.

Approximately 100 to approximately 700 milliliters of unfilled epoxy can be used for pipes having a length of approximately 5 feet to approximately 30 feet, where the pipes are approximately 2 inches in diameter.

The mixed epoxy having a viscosity of approximately 1200 to approximately 5000 cps has at least approximately 25% fillers.

The mixed epoxy having a viscosity of approximately 5001 to approximately 10000 cps has at least approximately 20% fillers.

The mixed epoxy having a viscosity of approximately 10001 to approximately 15000 cps has at least approximately 15% fillers.

The mixed epoxy having a viscosity of approximately 15001 to approximately 25000 cps has at least approximately 10% fillers.

The mixed epoxy having a viscosity of approximately 25001 to approximately 60000 cps has at least approximately 5% fillers.

The method and process can further include the step of applying and maintaining a positive pressure fluid, that can include air, throughout the pipes to set the barrier coating for a selected time of at least several minutes, wherein the positive pressure fluid is at a pressure level of at least approximately 1.5 PSI.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

This is a Divisional of U.S. patent application Ser. No. 13/683,332 filed Nov. 21, 2012, which is a Divisional of U.S. patent application Ser. No. 13/676,784 filed Nov. 14, 2012, now U.S. Pat. No. 8,795,768, which is a Divisional of U.S. patent application Ser. No. 12/813,873 filed Jun. 11, 2010, now U.S. Pat. No. 8,343,579, which is a Divisional of U.S. patent application Ser. No. 11/649,647 filed Jan. 4, 2007, now issued as U.S. Pat. No. 7,858,149, which is a Continuation-In-Part of U.S. patent application Ser. No. 11/246,825 filed Oct. 7, 2005, now issued as U.S. Pat. No. 7,517,409, which is a Divisional of U.S. patent application Ser. No. 10/649,288 filed Aug. 27, 2003, now issued as U.S. Pat. No. 7,160,574 on Jan. 9, 2007, which claims the benefit of priority to U.S. Provisional Patent Application 60/406,602 filed Aug. 28, 2002, all of which are incorporated by reference.

Figure 1:
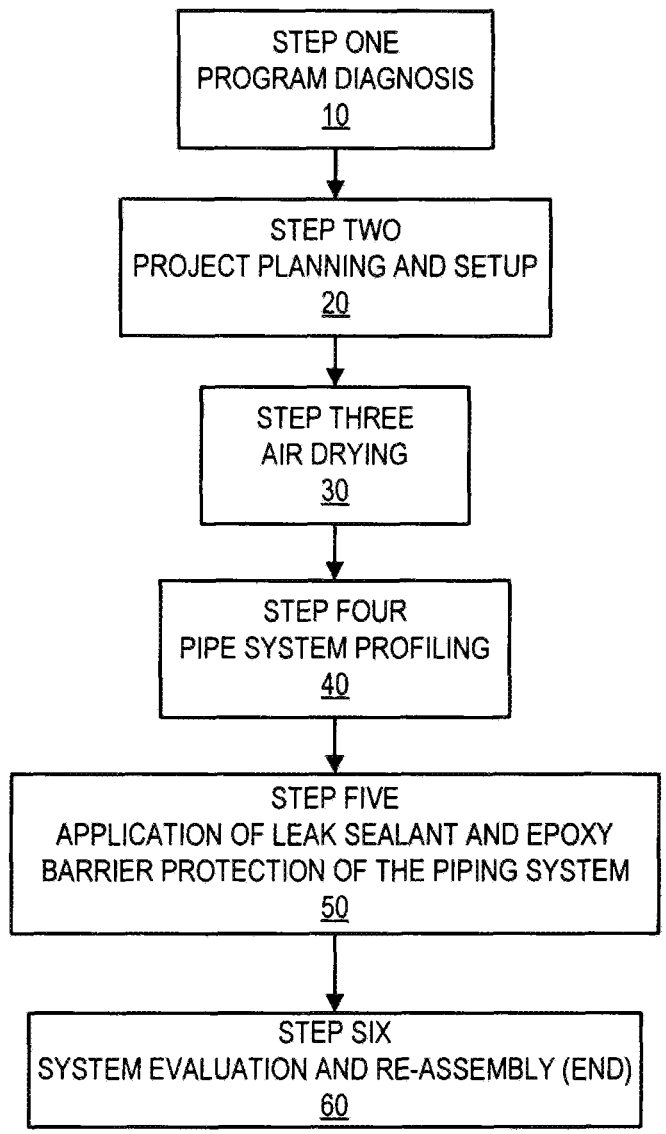
FIG. 1 shows the general six steps that is an overview for applying the barrier coating leak sealant.
Figure 2A:
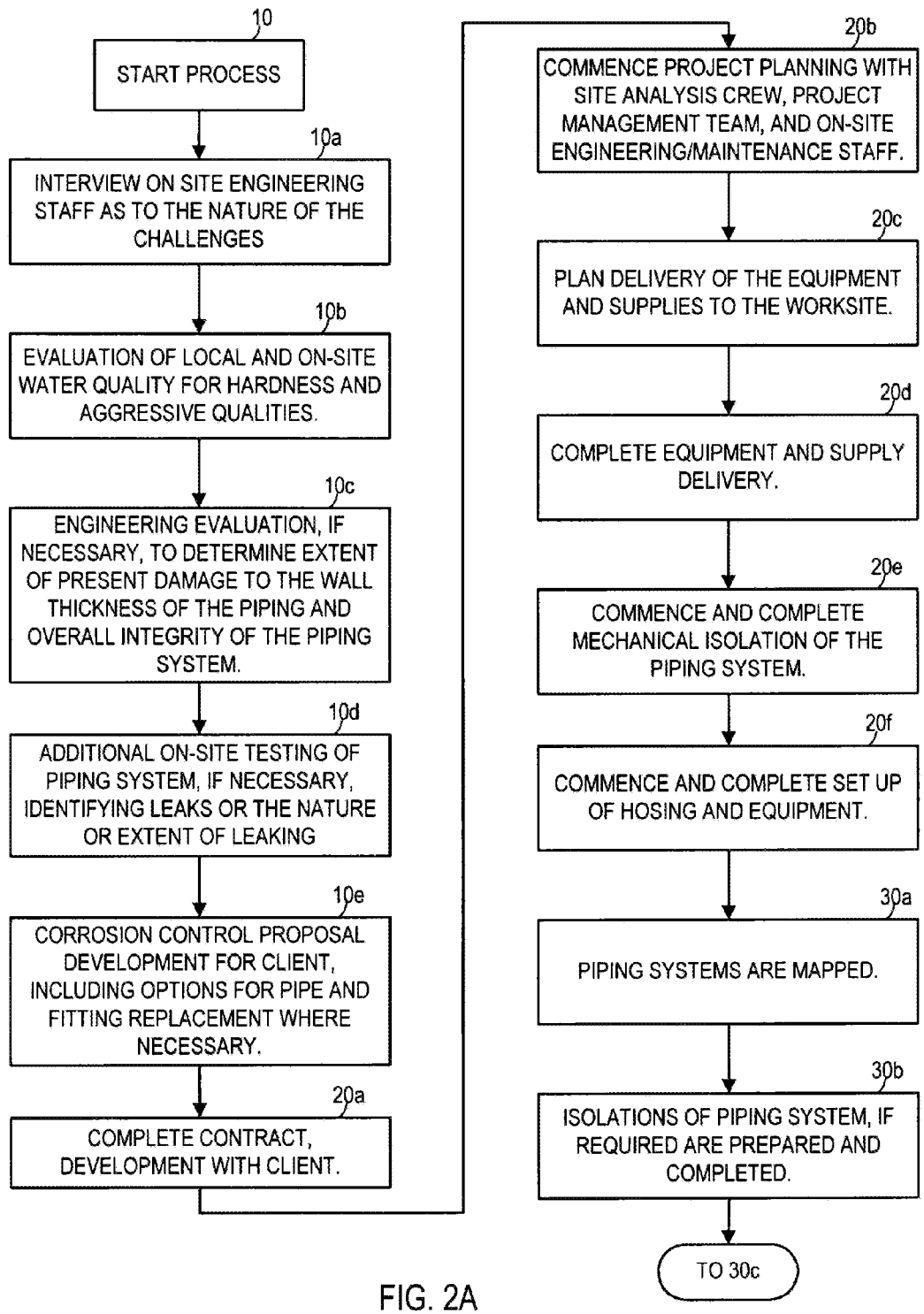
FIGS. 2A, 2B, 2C and 2D shows a detailed process flowchart using the steps of FIG. 1 for providing the barrier coating leak sealant.
Figure 2B:
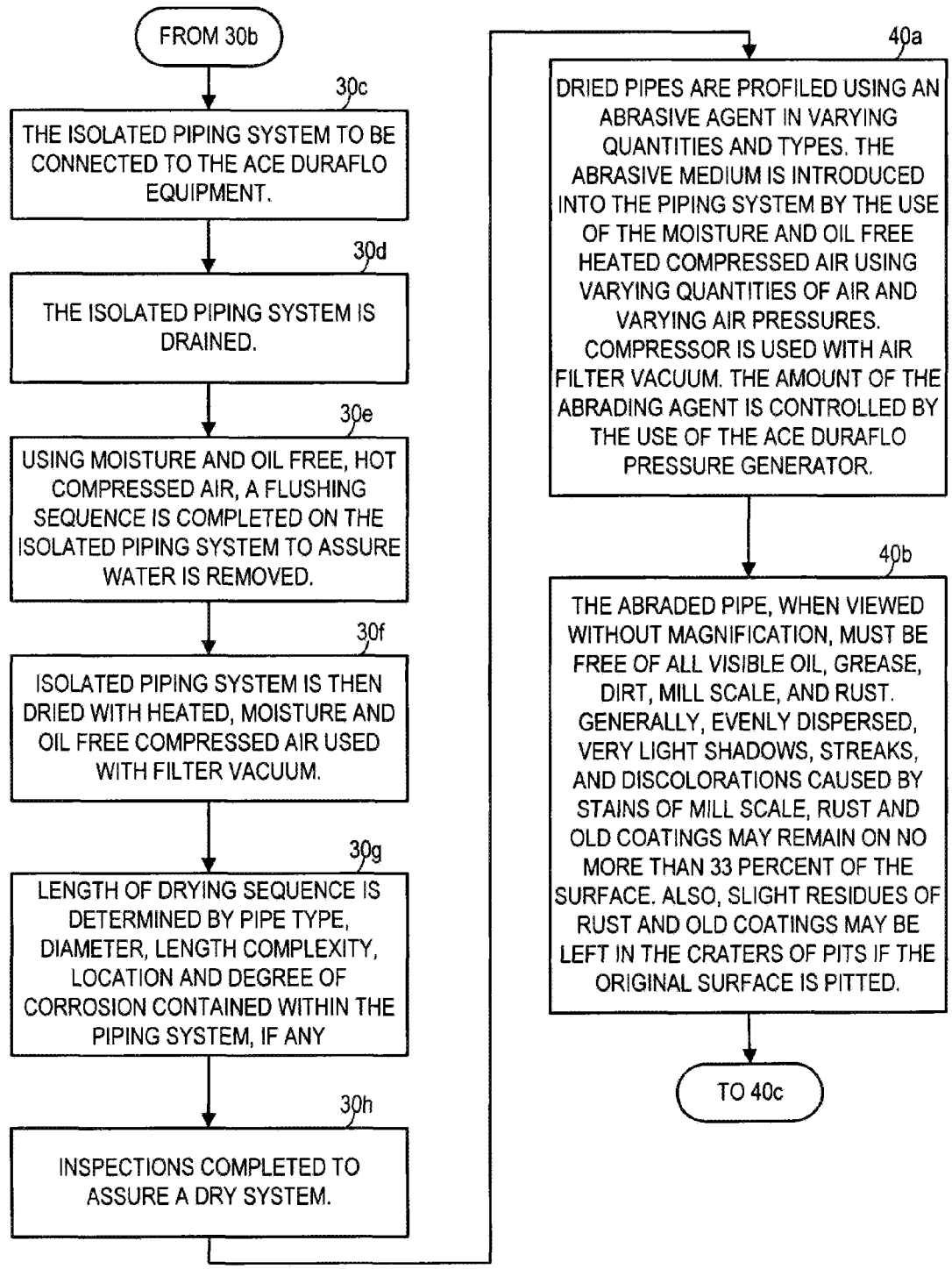
Figure 2C:
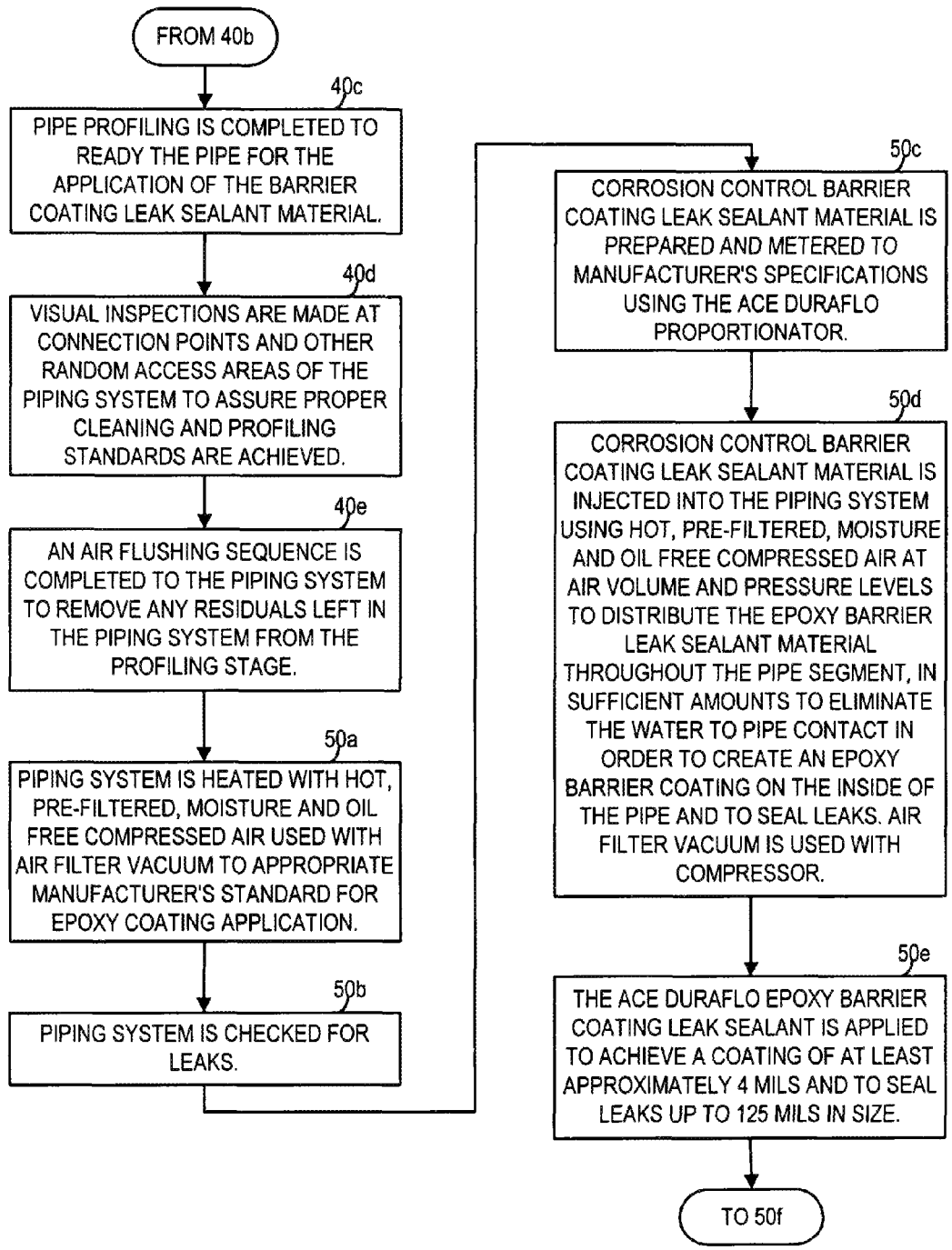
Figure 2D:
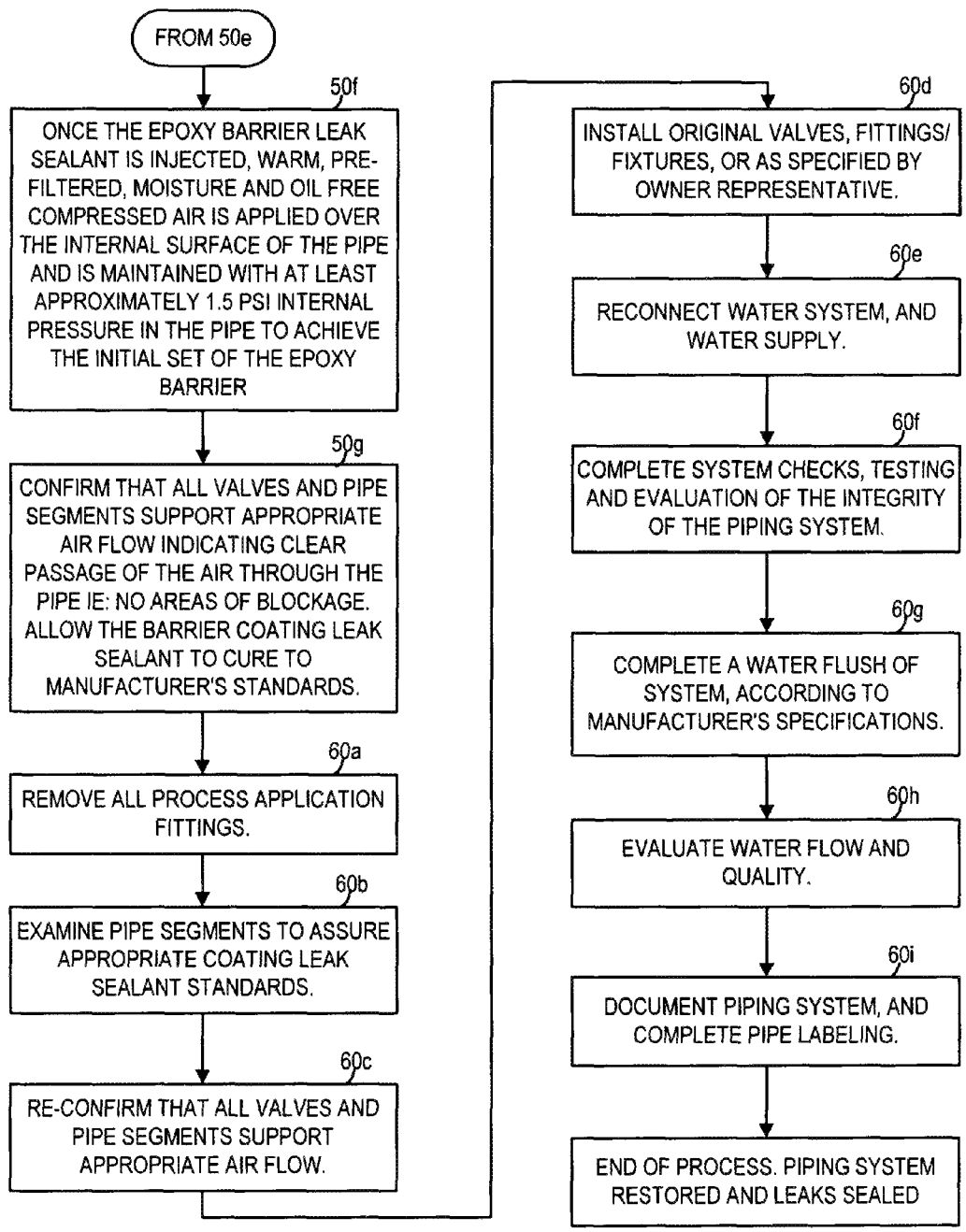

FIG. 1 shows the general six steps for a project overview for applying the barrier coating leak sealant to an existing piping system, which include step one, 10 program diagnosis, step two, 20 project planning, step three, 30 drying piping system, step four 40, profiling the piping system, step five, 50 applying barrier coating leak sealant to the interior walls of the pipes in the piping system, and final step six 60 evaluation and return to operation of the piping system.

Step One—Problem Diagnosis 10

For step one, 10, several steps can be done to diagnose the problem with a piping system in a building, and can include:
 (a) Interview onsite engineering staff, property mangers, owners or other property representatives as to the nature of the current problem with the piping system.
 (b) Evaluation of local and on-site water chemistry being used in the piping system for hardness and aggressive qualities.
 (c) Engineering evaluation, if necessary, to determine extent of present damage to the wall thickness of the piping and overall integrity of the piping system.
 (d) Additional on-site testing of piping system, if necessary, identifying leaks or the nature or extent of leaking.
 (e) Corrosion control, leak sealing proposal development for client, including options for pipe and fitting replacement where necessary.

After completion of step one, 10, the project planning and setup step 20 can be started.

Step Two—Project Planning and Setup 20

For step two, 20, several steps can be followed for planning and setup for restoring the integrity of the piping system in a building, and can include:
 (a) Complete contract development with client, after the diagnosis contract has started.
 (b) Commence project planning with site analysis crew, project management team, and on-site engineering/maintenance staff.
 (c) Plan delivery of the equipment and supplies to the worksite.
 (d) Complete equipment and supply delivery to worksite.
 (e) Commence and complete mechanical isolation of the piping system.
 (f) Commence and complete set up of hosing and equipment.

Step Three—Air Drying—Step 1 Method of Corrosion Control and Leak Repair 30

For step three, 30, the piping system to be prepared for the coating by drying the existing pipes, and can include:
 (a) Piping systems are mapped.
 (b) Isolations of piping systems or pipe sections are prepared and completed.
 (c) The isolated piping system to receive the barrier coating leak sealant is adapted to be connected to the barrier coating equipment.
 (d) The isolated pipe section or system is drained of water.
 (e) Using moisture and oil free, hot compressed air, a flushing sequence is completed on the piping system to assure water is removed.
 (f) Piping system is then dried with heated, moisture and oil free compressed air.
 (g) Length of drying sequence is determined by pipe type, diameter, length complexity, location and degree of corrosion contained within the piping system, if any.
 (h) Exiting debris is captured with use of an air filter vacuum, drawing air, which is used simultaneously with compressor.
 (i) Inspections are completed to assure a dry piping system ready for the barrier coating and sealant.

Step Four—Piping System Profiling—Step 2 of Method of Corrosion Control and Leak Sealant 40

For step four, 40, the piping system is to be profiled, and can include:
 (a) Dried pipes can be profiled using an abrasive agent in varying quantities and types. The abrasive medium can be introduced into the piping system by the use of the moisture and oil free heated compressed air using varying quantities of air and varying air pressures. The amount of the abrading agent is controlled by the use of a pressure generator.
 (b) The simultaneous use of the air filter vacuum at the exit end, drawing air to assist the compressor, reducing the effects of friction loss in the piping system, enhancing the effects of the sanding and debris removal.
 (c) The abraded pipe, when viewed without magnification, must be generally free of all visible oil, grease, dirt, mill scale, and rust. Generally, evenly dispersed, very light shadows, streaks, and discolorations caused by stains of mill scale, rust and old coatings may remain on no more than approximately 33 percent of the surface. Also, slight residues of rust and old coatings may be left in the craters of pits if the original surface is pitted.
 (d) Pipe profiling is completed to ready the pipe for the application of the barrier coating leak sealant material.
 (e) Visual inspections can be made at connection points and other random access areas of the piping system to assure proper cleaning and profiling standards are achieved.
 (f) An air flushing sequence is completed to the piping system to remove any residuals left in the piping system from the profiling stage.

Step Five—Corrosion Control Epoxy Sealing Leak Repair and Protection of the Piping—Step 3 of the Method of Corrosion Control and Leak Repair 50

For step five, 50, the piping system is barrier coated and leaks sealed and can include:
 (a) Piping system can be heated with hot, pre-filtered, moisture and oil free compressed air to an appropriate standard for an epoxy coating application.
 (b) Piping system can be checked for leaks.
 (c) If leaks are identified or are suspect and the approximate size determined the operator may choose to apply the coating material without fillers, if the leak is determined to be >approximately 30 mils in width the operator can decide to add fillers to the coating material, prior to injection into the piping system.
 (d) Coating and leak sealing material can be prepared and metered to manufacturer's specifications using a proportionator.
 (e) The barrier coating leak sealant and fillers are placed into the epoxy carrying tube or injection device.

(f) The coating and leak sealant material can be injected into the piping system using hot, pre-filtered, moisture and oil free compressed air at temperatures, air volume and pressure levels to distribute the epoxy barrier coating leak sealant throughout the pipe segment, in sufficient amounts to eliminate the water to pipe contact in order to create an epoxy barrier coating on the inside of the pipe and seal the leak in a single operation. During this wetting out stage a vacuum filter maybe used in conjunction with the compressor to assist the wetting out of the coating material. At all times, a neutral or positive pressure must be maintained on the inside of the pipe.

(g) The coating can be applied to achieve a coating of at least approximately 4 mils and sealing leaks up to approximately 125 mils in size.

(h) Once the epoxy barrier coating leak sealant is injected and the piping segment is wetted out warm, pre-filtered, moisture and oil free compressed air can be applied to create a positive pressure inside the pipe with a continuous positive pressure maintained of at least approximately 1.5 P.S.I. over the internal surface of the pipe to achieve the initial set of the epoxy barrier coating sealant takes place. After initial set and still maintaining positive pressure confirm that all valves and pipe segments support appropriate air flow indicating clear passage of the air through the pipe i.e.: no areas of blockage. Allow the barrier coating leak sealant to cure to manufacturer's standards.

Positive pressure can be maintained until the epoxy has reached its "initial set." The time depends on the epoxies pot life, the application temperature of the epoxy and the maintenance temperature and the actual film thickness of the epoxy, these factors all come into play when getting the epoxy to its initial set. For example, an epoxy having a 30 minute pot life, measured at room temperature, will need a positive pressure for at least approximately 30 minutes at no less then room temperature. Thus, a positive pressure should be maintained to at least the manufacturers specification of the epoxies pot life when measured at room temperature or until initial set is achieved.

Step Six—System Evaluation and Re-Assembly 60

The final step six, 60 allows for restoring the piping system to operation and can include:

(a) Remove all process application fittings.
(b) Examine pipe segments to assure appropriate coating standards, check to ensure all leaks are sealed.
(c) Re-confirm that all valves and pipe segments support appropriate air flow.
(d) Install original valves, fittings/fixtures, or any other fittings/fixtures as specified by building owner representative.
(e) Reconnect water system, and water supply.
(f) Complete system checks, testing and evaluation of the integrity of the piping system.
(g) Complete a water flush of system, according to manufacturer's specifications.
(h) Evaluate water flow and quality.
(i) Document piping layout schedule, and complete pipe labeling.

FIGS. 2A, 2B, 2C and 2D show a detailed process flowchart using the steps of FIG. 1 for providing the barrier coating leak sealant. These flow chart figures show a preferred method of applying a novel barrier coating leak sealant for the interior of small diameter piping systems following a specific breakdown of a preferred application of the invention.

Components in FIG. 3 will now be identified as follows:

| IDEN-TIFIER | EQUIPMENT |
| --- | --- |
| 100 | 395, 850, 1100, 1600 CFM Compressors Outfitted with Aftercooler, Water separator, Fine Filter and Reheater (if required) |
| 200 | Main Air Header and Distributor (Main Header) |
| 300 | Floor Manifold (optional) |
| 400 | Sander |
| 500 | Pre-Filter |
| 600 | Dust Collector System (Air Filter Vacuum) |
| 700 | Portable Epoxy Metering and Dispensing Unit (Epoxy Mixer) |
| 800 | Epoxy Barrier Coating and Sealant |
| 900 | Epoxy Carrying Tube - Injection Device |

Figure 3:
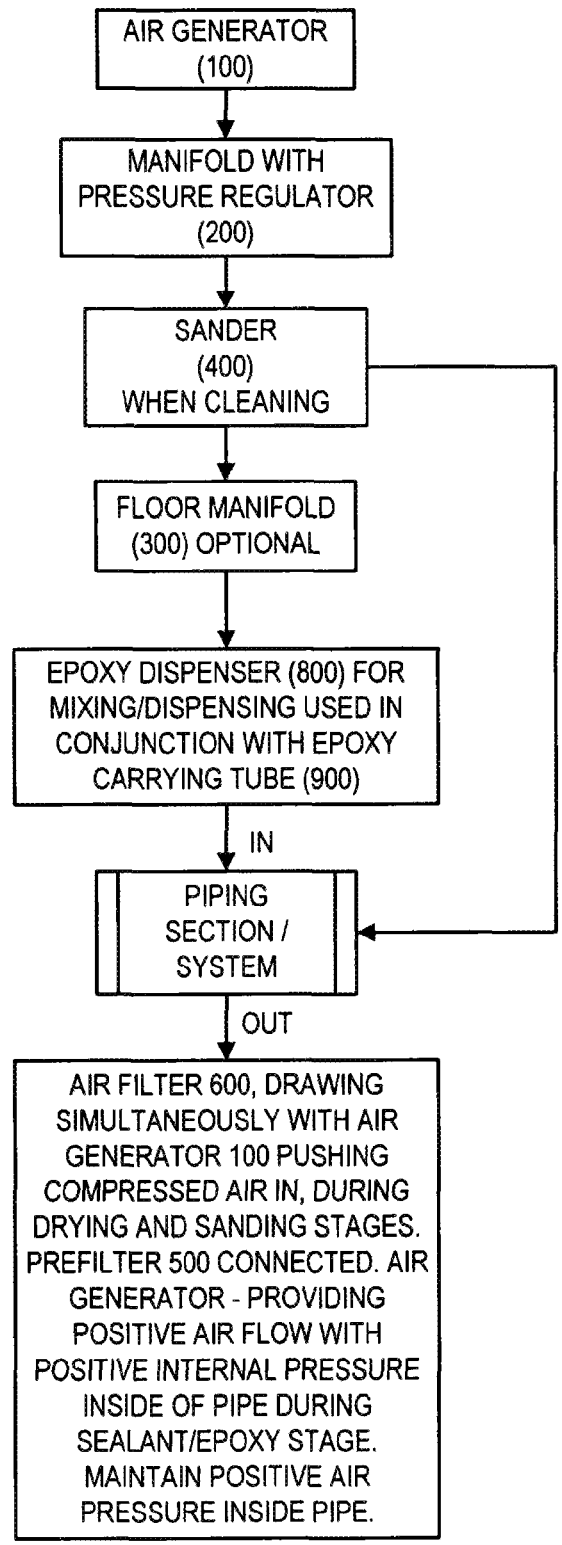
FIG. 3 shows a flow chart of the set up of the invention.

Referring to FIG. 3, components 100-900 can be located and used at different locations in or around a building. The invention allows for an entire isolated building piping system to be cleaned in one single pass through run without having to dismantle either the entire or multiple sections of the piping system. The piping system can include pipes having diameters of approximately ⅜ of an inch up to approximately 6 inches in diameter with the piping including bends up to approximately ninety degrees or more throughout the building. The invention allows for an entire isolated building piping system to have the interior surfaces of the pipes coated and leaks sealed in one single pass through run without having to dismantle either the entire or multiple parts of the piping system. Each of the components will now be defined.

100 Air Compressor

The air compressors 100 can provide filtered and heated compressed air. The filtered and heated compressed air employed in various quantities is used, to dry the interior of the piping system, as the propellant to drive the abrasive material used in cleaning of the piping system and is used as the propellant in the application of the epoxy barrier coating leak sealant and the drying of the epoxy barrier coating leak sealant once it has been applied. The compressors 100 also provide compressed air used to propel ancillary air driven equipment.

200 Main Air Header and Distributor

An off the shelf main header and distributor 200 shown in FIG. 3 can be one Manufactured By: Media Blast & Abrasives, Inc. 591 W. Apollo Street Brea, Calif. 92821.

The Main Header 200 provides safe air management capability from the air compressor for both regulated and unregulated air distribution (or any combination thereof) to the various other equipment components and to both the piping system risers and fixture outlets for a range of piping configurations from a single family home to a multi-story building. The air enters through the 2" NPT inlet to service the pressure vessel. The main header 200 can manage air capacities ranging to approximately 1600 CFM and approximately 200 psi.

There are many novel parts and benefits with the Main Header and Distributor 200. The distributor is portable and is easy to move and maneuver in tight working environments. Regulator Adjustment can easily and quickly manage air capacities ranging to approximately 1600 CFM and approximately 200 psi, and vary the operating airflows to each of the other ancillary equipment associated with the invention. The Air Pressure Regulator and the Method of Distributing the air allows both regulated and unregulated air management from the same equipment in a user-friendly, functional manner. The approximately 1" Valving allows accommodation for both approximately 1" hosing and with adapters, and hose sizes of less than approximately 1"" can be used to meet a wide variety of air demand needs on a job site. The insulated cabinet, surrounding air works dampens noise associated with the movement of the compressed air. The insulated cabinet helps retain heat of the pre-dried and heated compressed air, the pre-dried and heated compressed air being an integral part of the invention. The insulated cabinet helps reduce moisture in the pressure vessel and air supply passing through it. Finally, the valving of the pressure vessel allows for delivery (separate or simultaneous) of regulated air to the side mounted air outlet valves, the top mounted regulated air outlet valves as well as the top mounted unregulated air outlet valves.

300 Floor Manifold

An on off-the-shelf floor manifold 300 can be one Manufactured By: M & H Machinery 45790 Airport Road, Chilliwack, BC, Canada As part of the general air distribution system set up, the floor manifolds 300 can be pressure rated vessels designed to evenly and quietly distribute the compressed air to at least 5 other points of connection, typically being the connections to the piping system. Airflow from each connection at the manifold is controlled by the use of individual full port ball valves.

There are many novel parts and benefits to the Air Manifold 300. The portability of manifold 300 allows for easy to move and maneuver in tight working environments. The elevated legs provide a stable base for unit 300 as well as keep the hose end connections off the floor with sufficient clearance to permit the operator ease of access when having to make the hose end connections. The threaded nipples placed at approximately 45° angle allow for a more efficient use of space and less restriction and constriction of the airline hoses they are attached to. Multiple manifolds 300 can be attached to accommodate more than 5 outlets. The manifolds can be modular and can be used as 1 unit or can be attached to other units and used as more than 1.

400 Pressure Generator System-Sander

A pressure generator sander 400 that can be used with the invention can be one Manufactured By: Media Blast & Abrasives, Inc. 591 W. Apollo Street Brea, Calif. 92821.

The pressure generating sander system 400 can provide easy loading and controlled dispensing of a wide variety of abrasive medium in amounts up to approximately 1.3 US gallons at a time. The pressure generator sander can include operational controls that allow the operator to easily control the amount of air pressure and control the quantity of the abrasive medium to be dispersed in a single or multiple application. The abrasive medium can be controlled in quantity and type and is introduced into a moving air steam that is connected to a pipe or piping systems that are to be sand blasted clean by the abrasive medium. The sand can be introduced by the pressure generator sander system 400 by being connected to and be located outside of the piping system depicted in FIG. 3. The novel application of the sander system 400 allows for cleaning small pipes having diameters of approximately ⅜" up to approximately 6".

Table 1 shows a list of preferred dry particulate materials with their hardness ratings from 1 to 10 (being the hardest), and grain shapes that can be used with the sand generator 400, and Table 2 shows a list of preferred dry particulate particle sieve sizes that can be used with the invention.

TABLE 1

PARTICULATES

| Material | Hardness Rating | Grain Shape |
|---|---|---|
| Silicon Carbide | 10 | Cubical |
| Aluminium Oxide | 9 | Cubical |
| Silica | 5 | Rounded |
| Garnet | 5 | Rounded |

Table 1 shows the hardness and shapes of the typical types of particulates used in the cleaning and sanding process. Based on the MOH scale of hardness it is found that a 5 or higher hardness particulate be used in this process. A particulate such as silicon carbide is recommended over a softer garnet particulate when used to clean and profile harder metal pipes, such as steel, where the metal is a softer, such as copper it can be cleaned and profiled with a less hard particulate such as garnet.

TABLE 2

PARTICULATE SIZE
SIEVE SIZE OPENING

| U.S. Mesh | Inches | Microns | Millimeters |
|---|---|---|---|
| 4 | .187 | 4760 | 4.76 |
| 8 | .0937 | 2380 | 2.38 |
| 16 | .0469 | 1190 | 1.19 |
| 25 | .0280 | 710 | .71 |
| 45 | .0138 | 350 | .35 |

Table 2 describes the various standards for measuring particulate size. In the cleaning and profiling stage an operator will decide to use particulate of various sizes depending on the size of pipe, the type of piping material i.e. steel or copper and the degree and type of build up inside the pipe. In a copper pipe situation it is common to use a 24/25 mesh size. When cleaning a heavily encrusted steel pipe an operator might use a small particulate such as a 45 or 60 mesh to bore a hole through the build up with our getting clogged up. As the opening inside the pipe increases by cleaning, larger particulate sizes can be used.

There are many novel parts and benefits to the use of the Pressure Generator Sander System 400. The portability allows for easy to move and maneuver in tight working environments. The sander 400 is able to accept a wide variety of abrasive media in a wide variety of media size. Variable air pressure controls in the sander 400 allows for management of air pressures up to approximately 125 PSI. A mixing Valve adjustment allows for setting, controlling and dispensing a wide variety of abrasive media in limited and controlled quantities, allowing the operator precise control over the amount of abrasive medium that can be introduced into the air stream in a single or multiple applications. The filler lid incorporated as part of the cabinet and the pressure pot allows the operator to load with ease, controlled amounts of the abrasive medium into the pressure pot. The pulse button can be utilized to deliver a single sized quantity of the abrasive material into the air stream or can be operated to deliver a constant stream of abrasive material in to the air stream. All operator controls and hose connections can be centralized for ease of operator use.

500 Abrasive Reclaim Separator Module (Pre-Filter)

An off-the-shelf pre-filter that can be used with the invention can be one Manufactured By: Media Blast & Abrasives, Inc. 591 W. Apollo Street Brea, Calif. 92821

During the pipe profiling stage, the Pre-Filter 500 allows the filtering of air and debris from the piping system for more than two systems at a time through the 2—approximately 2" NPT inlets. The cyclone chamber/separator captures the abrasive material and large debris from the piping system, the byproducts of the pipe profiling process. The fine dust particles and air escape through the approximately 8" air and dust outlet at the top of the machine and are carried to the dust collection equipment 600, which filters, from the exhausting air, fine particulates, that may not have been captured with the Pre-Filter 500.

There are many novel parts and benefits to the Pre-Filter 500. The pre-filter has portability and is easy to move and maneuver in tight working environments. The Dust Drawer with Removable Pan allows for easy clean out of the abrasive media and debris from the pipe. The Cyclone Chamber/Separator slows and traps the abrasive media and debris from the piping system and air stream and prevents excess debris from entering into the filtration equipment. The 2—approximately 2" NPT Inlets allows a full range of air filtration from two separate riser or piping systems. Use of the approximately 8" or greater flex tube as an expansion chamber results in reducing the air pressure of the air as it leaves the Pre-filter 500 and reduces the potential for back pressure of the air as it departs the Pre-filter and enhances the operational performance of the air filter vacuum 600. When used in conjunction with the air filter vacuum 600, the Pre-filter 500 provides a novel way of separating large debris from entering the final stage of the filtration process. By filtering out the large debris with the Pre-filter 500 this promotes a great efficiency of filtration of fine particles in the final stages of filtration in the air filter vacuum 600. The approximately 8" air and dust outlet to the air filter vacuum 600 from the Pre-filter 500 permits the compressed air to expand, slowing it in velocity before it enters the air filter vacuum 600, which enhances the operation of the air filter vacuum 600. Process cost savings are gained by the use of the Pre-filter 500 by reducing the impact of filtering out the large amounts of debris at the Pre-filter stage prior to air entering the air filter vacuum 600. This provides for greater operating efficiencies at the air filter vacuum 600 a reduction in energy usage and longer life and use of the actual fine air filters used in the air filter vacuum 600.

600 Dust Collection Filter—Air Filter Vacuum

An off-the-shelf example of an air filter vacuum 600 used with the invention can be one Manufactured By: Media Blast & Abrasives, Inc. 591 W. Apollo Street, Brea, Calif. 92821.

During the pipe profiling stage, the air filter vacuum or dust collector 600 is the final stage of the air filtration process. The dust collector 600 filters the passing air of fine dust and debris from the piping system after the contaminated air first passes through the pre-filter 500 (abrasive reclaim separator module).

During the drying stage the filter 600 can be used simultaneously with compressor 100 aids in drawing air through the piping system. During the sanding or cleaning stage the filter 600 can be used with compressor 100 the filter 600 assists by drawing air through the piping system. The filter 600 can be used simultaneously with the compressor 100 to create a pressure differential in the piping system which is used to reduce the effects of friction loss and assists in a pulling action within the pipe during the drying and sanding or cleaning stages as well as the coating stage. The filter 600 can be capable of filtering air in volumes up to approximately 1100 CFM.

There are many novel parts and benefits to the Air Filter 600. The air filter has portability and is easy to move and maneuver in tight working environments. The Dust Drawer with Removable Pan allows for easy clean out of the abrasive media and debris from the filtration chamber. The 8" flexible duct permits the compressed air to expand and slow in velocity prior to entering the dust collector 600, enhancing efficiency. The sliding air control exit vent permits use of a lower amperage motor on start up. The reduced electrical draw enables the dust collector 600 to be used on common household electrical currents while still being able to maintain its capacity to filter up to approximately 1100 CFM of air. The air filter 600 keeps a flow of air running over the epoxy and enhancing its drying and curing characteristics. The dust collector 600 creates a vacuum in the piping system, which is used as method of checking for airflow in the piping system.

The air filter 600 can be used simultaneously with compressor 100 to reduce the effects of friction loss, enhancing drying, sanding, epoxy injection and drying.

700 Portable Epoxy Metering and Dispensing Unit

A metering and dispensing unit 700 used with the invention can be one Manufactured by: Lily Corporation, 240 South Broadway, Aurora, Ill. 60505-4205.

The Portable Epoxy Metering and Dispensing Unit 700 can store up to approximately 3 US gallons of each of A and B component of the two mix component epoxy, and can dispense single shots up to approximately 14.76 oz, in capacities up to approximately 75 US gallons per hour.

The unit 700 can be very mobile and can be used both indoors and outdoors, and it can operate using a 15 Amp 110 AC electrical service i.e.: regular household current and approximately 9 cubic feet (CFM) at 90 to 130 pounds per square inch. The unit 700 requires only a single operator.

The epoxy 800 used with the unit 700 can be heated using this unit to its recommended temperature for application. The epoxy 800 can be metered to control the amount of epoxy being dispensed.

There are many novel parts and benefits to the Epoxy Metering and Dispensing Unit 700, which include portability and is easy to move and maneuver in tight working environments. The heated and insulted cabinet, all epoxy transit hoses, valves and pumps can be heated within the cabinet. The Top filling pressurized tanks offers ease and access for refilling. Epoxy 800 can be metered and dispensed accurately in single shot or multiple shots having the dispensing capacity up to approximately 14.76 ounces of material per shot, up to approximately 75 gallons per hour.

The position of mixing head permits a single operator to fill the portable epoxy carrying tubes 900 in a single fast application. The drip tray permits any epoxy overspill at the time of filling to be contained in the drip tray, containing the spill and reducing cleanup. The epoxy carrying tube hanger allows the operator to fill and temporarily store filled epoxy tubes, ready for easy distribution. The pump and heater combination allows for the epoxy to metered "on ratio" under a variety of conditions such as changes in the viscosity of the epoxy components which can differ due to temperature changes which effect the flow rates of the epoxy 800 which can differ giving the operator an additional control on placement of the epoxy 800 by changing temperature and flow rates. Unit 700 provides greater operator control of the characteristics of the epoxy 800 in the process.

800 Epoxy Barrier Coating Leak Sealant

A preferred epoxy barrier coating that can be used with the invention can be one Manufactured by: CJH, Inc. 2211 Navy Drive, Stockton, Calif. 95206. The barrier coating product used in this process can be a 2-part thermo set resin with a base resin and a base-curing agent.

The preferred thermo set resin is mixed as a two-part epoxy that is used in the invention. When mixed and applied, it forms a durable barrier coating leak sealant on pipe interior surfaces and other substrates. The barrier coating leak sealant provides a barrier coating that protects those coated surfaces from the effects caused by the corrosive activities associated with the chemistry of water and other reactive materials on the metal and other substrates and seal leaks in the pipe.

The epoxy barrier coating sealant can be applied to create a protective barrier coating and leak sealant to pipes ranging in size approximately 3/8" to approximately 6" and greater. The barrier coating can be applied around bends intersections, elbows, tee's, to pipes having different diameters and make up. The barrier coating leak sealant can be applied to pipes in any position e.g.: vertical or horizontal and can be applied as a protective coating leak sealant to metal and plastic type pipes used in fire sprinkler systems and natural gas systems. At least an approximately 4 mils coating layer can be formed on the interior walls of the pipes. The barrier coating leak sealant protects the existing interior walls and can also stop leaks in existing pipes which have small openings and cracks, and the like, of up to approximately 125 mils in size.

Although the process of application described in this invention includes application of thermo set resins other types of thermo set resins can be used.

For example, other thermo set resins can be applied in the process, and can vary depending upon viscosity, conditions for application including temperature, diameter of pipe, length of pipe, type of material pipe comprised of, application conditions, potable and non potable water carrying pipes, and based on other conditions and parameters of the piping system being cleaned, coated and leaks sealed by the invention.

Other thermo set type resins that can be used include but are not limited to and can be one of many that can be obtained by numerous suppliers such as but not limited to: Dow Chemical, Huntsmans Advances Material, formerly Ciba Giegy and Resolution Polymers, formerly Shell Chemical.

A preferred viscosity range of the mixed as-applied epoxy used in this process, before fillers are introduced, when measured at room temperature, 25° C., is in the range of approximately 1,200 centipoises (cps) to approximately 60,000 centipoises (cps), and preferably in a narrower range of 10,000 to 60,000 centipoises (cps.)

The preferred pot life, measured at room temperature is at least approximately 30 minutes.

Fillers used in the process preferably can contain a mixture of low and high aspect ratio particles, acicular shaped particles, and plate like particles.

Fillers preferably made of the same epoxy material that comprises the barrier coating were used. Other materials may also be used include: glass flakes, glass fibers, epoxy fibers, mica, clay, silica, cork and plastics. The particle size and distribution of the fillers were noted as follows in Table 3

TABLE 3

| US Sieve Size | Inches | Millimeters | Microns |
| --- | --- | --- | --- |
| #8 | trace | .0937 | 2.38 | 2380 |
| #10 | trace | .0787 | 2.00 | 2000 |

TABLE 3-continued

| US Sieve Size | Inches | Millimeters | Microns |
| --- | --- | --- | --- |
| #12 | .6% | .0661 | 1.68 | 1680 |
| #16 | 21.6% | .0469 | 1.19 | 1190 |
| #20 | 41.2% | .0331 | .841 | 841 |
| #30 | 21.6% | .0234 | .595 | 595 |
| #40 | 6.0% | .0165 | .420 | 420 |

Table 3 shows the approximate breakdown of the size and % content of the size of fillers contained in the filler mix. For example, about 41.2% of the filler passed through a #20 size sieve or were approximately 0.841 millimeters in size. Only a trace amount of fillers passed through #8 sieve and were larger in size i.e. 2.38 millimeters, when compared to the size of the filler particles that passed through a #20 size sieve. The composition of mix of the various sizes of fillers were found to provide a wide range of opportunity for the fillers to fill the holes or cracks of various sizes that can be found in the piping system, up to approximately 125 mils in size.

Table 4 lists the amounts of epoxy needed for different length pipes and different diameter pipes.

TABLE 4

UNFILLED EPOXY QUANTITY expressed in Milliliters

| | Pipe Dimension | | | | | |
| --- | --- | --- | --- | --- | --- | --- |
| Length (ft) | 1/2" | 3/4" | 1" | 1 1/4" | 1 1/2" | 2" |
| 5 | 100 | 100 | 100 | 100 | 100 | 200 |
| 10 | 100 | 100 | 200 | 200 | 200 | 300 |
| 15 | 100 | 200 | 200 | 300 | 300 | 400 |
| 20 | 200 | 200 | 300 | 300 | 400 | 500 |
| 25 | 200 | 300 | 400 | 400 | 500 | 600 |
| 30 | 200 | 300 | 400 | 500 | 600 | 700 |

Referring to Table 5, a five foot length of piping having a 1/2 inch inside diameter would use approximately 100 milliliters of the novel unfilled epoxy.

A 30 foot long section of piping having an inside diameter of approximately 2 inches would use approximately 700 milliliters of the novel unfilled epoxy.

TABLE 5

| Viscosity of Mixed EPOXY (cps) | RATIO of Filler to Mixed Epoxy by Volume |
| --- | --- |
| 1,200-5,000 cps | at least approximately 25% filler |
| 5,001-10,000 cps | at least approximately 20% filler |
| 10,001-15,000 cps | at least approximately 15% filler |
| 15,001-25,000 cps | at least approximately 10% filler |
| 25,001-60,000 cps | at least approximately 5% filler |

Table 5 lists the viscosity ranges in centipoises, and the amount of filler that is mixed into the unfilled epoxy. For example, an epoxy having a viscosity of approximately 1200 to 5000 cps would have at least approximately 25% fillers.

An epoxy having a viscosity of approximately 25,001 to approximately 60,000 cps would have at least approximately 5% fillers.

Differences in viscosity were noted and primarily related to diameter and length of pipe. It was found that a lower viscose epoxy i.e. 1,200 cps to 5,000 cps provided the operator the ability to coat and seal leaks over a longer distance in a small diameter pipe. For example, a pipe of 1/2 inch or less in diameter over 100 feet in length. A more viscose epoxy say in the range of 25,001 cps to 60,000 cps provided the operator the ability to coat and seal leaks in larger diameter pipes say for example 2" and greater in diameter and to seal small leaks without out same quantity of fillers as required with a lower viscose epoxy.

Although the novel invention can be applied to all types of metal pipes such as but not limited to copper pipes, steel pipes, galvanized pipes, and cast iron pipes, the invention can be applied to pipes made of other materials such as but not limited to plastics, PVC (polyvinyl chloride), composite materials, polybutylene and the like. Additionally, small cracks and holes in plastic type and metal pipes can also be fixed in place by the barrier coating leak sealant.

Although the preferred applications for the invention are described with building piping systems, the invention can have other applications such as but not limited to include piping systems for swimming pools, underground pipes, in-slab piping systems, piping under driveways, various liquid transmission lines, tubes contained in heating and cooling units, tubing in radiators, radiant in floor heaters, chillers and heat exchange units, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for applying a barrier coating leak sealant to coat the interior walls in a pipe made of a nonmetal material selected from at least one of plastics, PVC (polyvinyl chloride), composite materials, or polybutylene, with fittings selected from at least one of nonmetal fittings, metal fittings or combinations thereof, comprising the steps of:
    providing a source of compressed air;
    providing dry abrasive particles;
    providing a filter;
    mixing an epoxy barrier coating leak sealant to form an epoxy leak sealant coating mixture to fill in a leak;
    removing moisture from the pipe made of the nonmetal material with the compressed air;
    cleaning interior wall surfaces of the pipe made of nonmetal material by blowing the compressed air charged with the particles inside of the pipe made of the nonmetal material;
    simultaneously drawing the compressed air charged with the particles to an exit end and collecting debris from the cleaning step with the filter;
    introducing the epoxy leak sealant coating mixture into the pipe made of the nonmetal material by a continuous positive pressure from the compressed air in a single sealant stage; and
    coating the interior walls of the pipe made of the nonmetal material with a single layer of the epoxy barrier coating leak sealant during the single sealant stage.

2. The method as claimed in claim 1, wherein the inert material is selected from at least one of an epoxy, glass, plastic foam parts, cork, clay.

3. The method as claimed in claim 1, wherein the nonmetal fittings selected from at least one of nonmetal fittings or combinations of metal fittings and nonmetal fittings, are made of a nonmetal material selected from at least one of plastics, PVC (polyvinyl chloride), or composite materials.

4. The method as claimed in claim 1, wherein the pipe made of the nonmetal material is a water pipe.

5. The method as claimed in claim 1, wherein the pipe made of the nonmetal material is a water pipe for a swimming pool.

6. The method as claimed in claim 1, wherein the removing step includes the step of introducing substantially moisture free and substantially oil free heated compressed air into the pipe made of the nonmetal material.

7. The method of claim 1, wherein the steps of introducing and coating include: maintaining the continuous positive pressure of air in the single sealant stage at a pressure level of at least approximately 1.5 P.S.I. over the internal surface of the pipe made of the nonmetal material to achieve the initial set of the epoxy barrier coating leak sealant.

8. A method for preparing inside walls of a pipe made of a nonmetal material selected from at least one of plastics, PVC (polyvinyl chloride), composite materials, or polybutylene with fittings selected from at least one of nonmetal, metal, or combinations thereof, for cleaning, coating and sealing and repair, comprising the steps of:
    (a) drying and cleaning, with dry abrasive particles, the inside walls of the pipe made of the nonmetal material wherein the drying and cleaning step further includes the step of:
    simultaneously pulling substantially moisture free and substantially oil free heated compressed air by a vacuum; and
    (b) coating and sealing the inside walls of the pipe made of the nonmetal material in a single sealant stage with a single leak sealant coating layer while maintaining a positive pressure in the pipe made of the nonmetal material during the single sealant stage.

9. The method of claim 8, wherein the drying and cleaning step includes the step of introducing substantially moisture free and substantially oil free heated compressed air to remove moisture from the pipe made of the nonmetal material.

10. The method as claimed in claim 8, wherein the pulling step includes the step of: filtering the substantially moisture free and substantially oil free heated compressed air passing through the vacuum.

11. The method of claim 8, wherein the coating and sealing step further includes the step of: maintaining the positive pressure during the single sealant stage at a pressure level of at least approximately 1.5 P.S.I over the internal surface of the pipe made of the nonmetal material to achieve the initial set of the leak sealant coating layer.

12. The method as claimed in claim 8, wherein the nonmetal fittings selected from at least one of nonmetal fittings or combinations of metal fittings and nonmetal fittings, are made of a nonmetal material selected from at least one of plastics, PVC (polyvinyl chloride), or composite materials.

13. A method for preparing and repairing inside walls of a pipe made of a nonmetal material selected from at least one of plastics, PVC (polyvinyl chloride), composite materials, or polybutylene, with fittings selected from at least one of metal fittings, nonmetal fittings or combinations thereof, the method comprising the steps of:
    (a) drying and cleaning, with dry abrasive particles, the inside walls of the pipe made of the nonmetal material, wherein the drying and cleaning step further includes the step of:
    simultaneously filtering substantially moisture free and substantially oil free heated compressed air passing through a vacuum; and
    (b) coating and repairing the inside walls of the pipe made of the nonmetal material with a leak sealant pumped into the pipe made of the nonmetal material at a continuous positive pressure by sealing the interior walls of the pipe made of the nonmetal material with a single layer of the leak sealant in a single sealant stage.

14. The method of claim 13, wherein the coating and repairing step further includes the step of: maintaining the continuous positive pressure in the single sealant stage at a pressure level of at least approximately 1.5 P.S.I. over the internal surface of the pipe made of the nonmetal material, to achieve the initial set of the leak sealant.

15. The method as claimed in claim 13, wherein the nonmetal fittings are made of a nonmetal material selected from at least one of plastics, PVC (polyvinyl chloride), composite materials, or polybutylene.

16. A method for internally sealing leaks in a pipe made of a nonmetal material selected from at least one of plastics, PVC (polyvinyl chloride), composite materials, or polybutylene, with fittings selected from as least one of nonmetal fittings, metal fittings or combinations thereof, comprising the steps of:
- drying and cleaning inside walls of a pipe made of the nonmetal material, with compressed air charged with dry particles of an abrasive substance wherein the drying and cleaning step includes the step of:
- simultaneously filtering air from the pipe made of the nonmetal material, with a vacuum; and
- coating inside walls of the pipe made of the nonmetal material, with an epoxy barrier coating leak sealant maintained by a continuous positive pressure to coat the inside walls of the pipe made of the nonmetal material with a single coating leak sealant layer in a single sealant stage.

\* \* \* \* \*